United States Patent [19]
Sakita

[11] Patent Number: 5,936,556
[45] Date of Patent: Aug. 10, 1999

[54] KEYBOARD FOR INPUTTING TO COMPUTER MEANS

[76] Inventor: Masami Sakita, 1259 El Camino Real, No. 121, Menlo Park, Calif. 94025

[21] Appl. No.: 08/891,738

[22] Filed: Jul. 14, 1997

[51] Int. Cl.[6] .................................................... G09G 3/02
[52] U.S. Cl. .............................. 341/28; 345/171; 400/110
[58] Field of Search ............................... 344/28; 345/171; 341/26, 22; 400/110

[56] References Cited

U.S. PATENT DOCUMENTS

| | | | |
|---|---|---|---|
| 207,559 | 8/1878 | Sholes | 400/110 |
| 1,245,633 | 11/1917 | Sugimoto et al. | 197/1 A |
| 1,600,494 | 9/1926 | Stickney | 400/110 X |
| 2,040,248 | 5/1936 | Dvorak et al. | 197/100 |
| 3,868,681 | 2/1975 | Ohyama | 341/28 |
| 4,064,983 | 12/1977 | Inose et al. | 197/1 A |
| 4,408,199 | 10/1983 | White | 341/28 |
| 4,481,508 | 11/1984 | Kamei et al. | 341/28 |
| 4,531,119 | 7/1985 | Nakayama et al. | 341/28 |
| 4,543,631 | 9/1985 | Kuruosu | 400/110 |
| 4,544,276 | 10/1985 | Hordeck | 400/110 |
| 4,737,040 | 4/1988 | Moon | 400/110 |
| 4,872,196 | 10/1989 | Royer et al. | 341/28 |
| 5,319,386 | 6/1994 | Gunn et al. | 345/173 |
| 5,631,643 | 5/1997 | Hisamori | 341/28 |

FOREIGN PATENT DOCUMENTS

| | | | |
|---|---|---|---|
| 60-225925 | 11/1985 | Japan | G06F 3/02 |
| 2-170215 | 7/1990 | Japan | G06F 3/02 |
| 4-119415 | 4/1992 | Japan | G06F 3/02 |
| 6-314150 | 11/1994 | Japan | G06F 3/02 |

*Primary Examiner*—Michael Horabik
*Assistant Examiner*—Albert K. Wong
*Attorney, Agent, or Firm*—Victor R. Beckman

[57] ABSTRACT

This novel computer input system consists of a keyboard with gojyuon-based key arrangements and software that is used in conjunction with the keyboard. The novel key arrangement of the keyboard of this invention uses the basic characteristics of the gojyuon table, but each key on the keyboard shows notations for both the Japanese gojyuon and English alphabet letter. For inputting Japanese, the column (or consonant) and the row (or vowel) of the gojyuon table are input in sequence. The gojyuon column keys are placed substantially on the right half of the keyboard, and the gojyuon row keys are placed substantially on the left half. The only letter consisting of a consonant in Japanese, (N), which is called hatsu-on, is input by pressing the key that represents the (NA) column of the gojyuon table with no vowels after it. Each letter of the English alphabet is assigned to the key that represents the same (or a similar) sound in the Japanese gojyuon row or column. For example, the English letter K is assigned to the key that represents the (KA) column of gojyuon. The keys for those English letters that are not found in the Japanese letter system are assigned to keys close to keys that represent similar sounds in a gojyuon row or column. The software used in conjunction with the keyboard enables the user to input the data through the keyboard to the computer, processes the input data, converts the input data into the form specified by the user, and displays the converted input data on the computer display.

16 Claims, 10 Drawing Sheets

KEYBOARD FOR INPUTTING TO COMPUTER MEANS

CROSS-REFERENCE TO RELATED APPLICATIONS

Japanese Patent Application No. 29822-1997

STATEMENT REGARDING FEDERALLY SPONSORED RESEARCH OR DEVELOPMENT

Not Applicable

REFERENCE TO A MICROFICHE APPENDIX

Not applicable

BACKGROUND OF THE INVENTION

This invention relates to a keyboard-based input system for computers, word processors, and the like used for inputting Japanese and/or English characters.

The computer is rapidly becoming a necessity for daily life all over the world. Although this is true in Japan, the computer is much less popular there than in the United States. It is believed that one of the major reasons for this is that most people are not used to the keyboard and find inputting Japanese a difficult task.

Two methods are commonly used to input Japanese to the computer. One, the "kana input method," uses a keyboard that has 46 Japanese iroha (or kana) letter keys. In the other method, the "Roma-ji input method," the computer keyboard has the QWERTY key arrangement (U.S. Pat. No. 207,557 by C. L. Sholes), the universally accepted standard for inputting English. In this method, Japanese kana letters are composed as combinations of the English (or Roman) alphabet letters representing columns and rows of the gojyuon table; once the proper combination of English letters is typed in, the computer finds a corresponding Japanese letter for that sound.

Neither of these methods is ideal for inputting Japanese to the computer. In the kana input method, touch-typing is very difficult because there are far more kana characters in Japanese (46) than letters in the English alphabet, and it is difficult to remember the location of each character on the keyboard. In the Roma-ji input method, the QWERTY arrangement is not only foreign to most Japanese users, but also difficult to use, discouraging many from using it. The QWERTY arrangement resulted from the need to arrange frequently used letter keys apart from each other to minimize the jamming and clashing of typebars in typewriters, not from any consideration of ease of use or efficiency. August Dvorak and William Dealey proposed an improved key arrangement (U.S. Pat. No. 2,040,248) for inputting English characters. Their system might somewhat increase the productivity of inputting Japanese to the computer, but it has never become popular. Besides, even if it were adopted for the Roma-ji input method, Japanese users would still have difficulty remembering the location of each character on the keyboard.

In addition, the existing methods are not flexible enough in inputting the growing number of foreign-origin words used in the Japanese language. Such words are written with a special style letter called "kata kana." The problem is not the use of "kata kana," but that in spelling foreign words methods not found in standard (or original) Japanese are applied, and the currently available input methods cannot easily accommodate them.

To overcome these problems, various input methods have been explored and developed over the years; the use of pen and voice are a couple of examples. We believe, however, that the keyboard is still the most efficient input method and that improvement of it is essential. New key arrangement methods proposed in recent years are Japanese patent application disclosures No. 60-225925 by Seiichiro Ube, No. 2-170215 by Hideo Koike et al., and No. 4-119415 by Masao Kubo et al. None of these new methods, however, is satisfactory for practical use, because they do not satisfy all the requirements for a new keyboard: namely, the arrangement of the keyboard must be simple and logical; the keyboard must integrate Japanese and English input methods; and it must be able to easily handle both original Japanese words and foreign-origin Japanese words.

The primary objective of this invention is to make inputting Japanese and English to the computer or word processor easy, especially for those who are familiar with the structure of the Japanese letter system gojyuon, which literally translates to English as "the 50 sounds."

BRIEF SUMMARY OF THE INVENTION

This novel computer input system consists of a keyboard with gojyuon-based key arrangements and software that is used in conjunction with the keyboard.

The novel key arrangement of the keyboard of this invention uses the basic characteristics of the gojyuon table, but each key on the keyboard shows notations for both the Japanese gojyuon and English alphabet letter. For inputting Japanese, the column (or consonant) and the row (or vowel) of the gojyuon table are input in sequence. The gojyuon column keys are placed substantially on the right half of the keyboard, and the gojyuon row keys are placed substantially on the left half. The only letter consisting of a consonant in Japanese, (N), which is called hatsu-on, is input by pressing the key that represents the (NA) column of the gojyuon table with no vowels after it. Each letter of the English alphabet is assigned to the key that represents the same (or a similar) sound in the Japanese gojyuon row or column. For example, the English letter K is assigned to the key that represents the (KA) column of gojyuon. The keys for those English letters that are not found in the Japanese letter system are assigned to keys close to keys that represent similar sounds in a gojyuon row or column.

The software used in conjunction with the keyboard enables the user to input the data through the keyboard to the computer, processes the input data, converts the input data into the form specified by the user, and displays the converted input data on the computer display.

The invention together with its other features and advantages thereof will be fully understood from consideration of the following detailed description thereof taken in consideration with the accompanying drawings. It should be understood that the drawings are for purposes of illustration only, and that the invention is not limited to the specific embodiments disclosed herein.

DETAILED DESCRIPTION OF THE INVENTION

Figure 1:
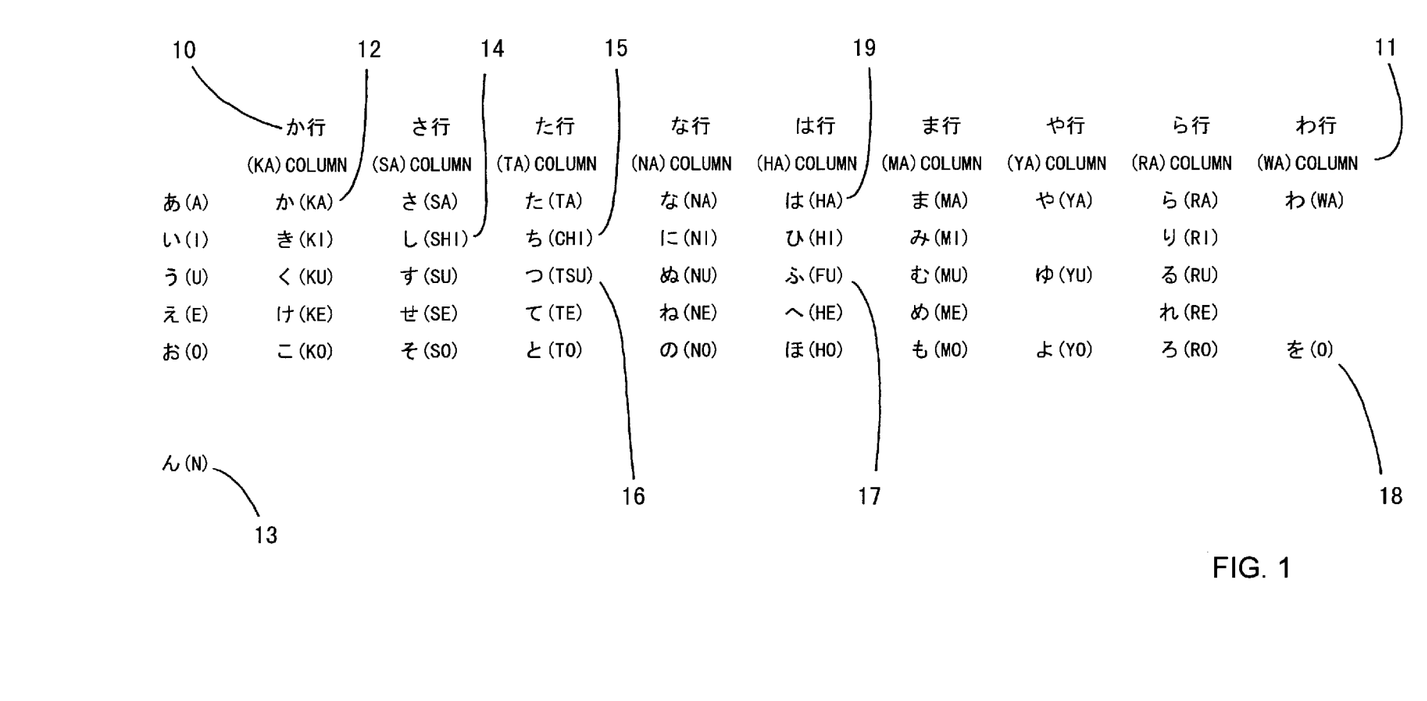
FIG. 1 shows the basic gojyuon table, containing the basic kana letters.

Reference is made first to FIG. 1, wherein the basic gojyuon table is shown. The top row 10 of the table shows the name of each column in Japanese, and the second row 11 shows its translation in English. The gojyuon table in FIG. 1 shows the basic Japanese kana letters (also called iroha) in a matrix form, wherein the rows indicate vowels and the columns indicate consonants. The rows are arranged from top to bottom in the order (A), (I), (U), (E), (O), and the columns are arranged from left to right in the order (KA), (SA), (TA), (NA), (HA), (MA), (YA), (RA), and (WA). Each letter indicates a sound or syllable, which is either one of the five vowels, (A, I, U, E, and O) by itself or a combination of a consonant represented by K, S, T, N, H, M, Y, R, or W, with one of the five vowels. In this document, we use parentheses to denote a Japanese kana letter. For example (KA) 12 is meant to indicate the Japanese kana letter that sounds like KA. The only Japanese letter with no vowels, (N) 13 is shown in FIG. 1 independently of the matrix form.

In general, each column represents the consonant shown by the corresponding letter in the English alphabet, but there are some exceptions. The letter in the (SA) column (I) row is (SHI) 14, which sounds as SHI not SI. The letter in the (TA) column (I) row is (CHI) 15, which sounds as CHI not TI. The letter in the (TA) column (U) row is (TSU) 16, which sounds TSU not TU. The letter in the (HA) column (U) row is (FU) 17, which sounds as FU not HU. The letter in the (WA) column (O) row is (O) 18, which sounds the same as vowel (O) in the far left column; the Japanese (O) in the (WA) column (O) row, however, is not the same as the letter that represents vowel (O).

Figure 2:
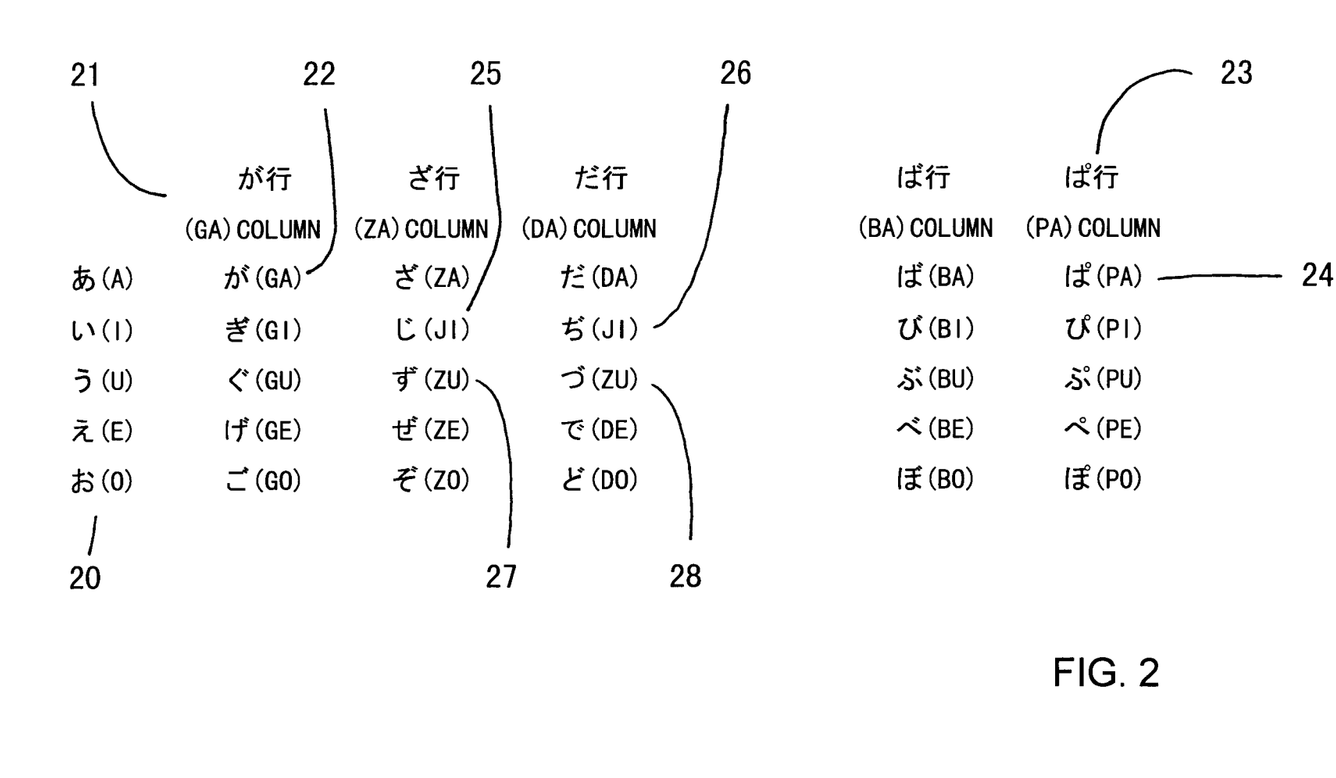
FIG. 2 shows the extended gojyuon table, which contains kana letters with "dakuten" and "maru."

All consonants in the basic gojyuon table shown in FIG. 1 have clear sounds. FIG. 2 shows an extended gojyuon table that includes non-clear sounds (daku-on) and half non-clear sounds (han-daku-on). In FIG. 2, as in FIG. 1, the rows are arranged from top to bottom in the order (A),(I),(U),(E), and (O) 20. The columns are arranged from left to right in the order (GA), (ZA), (DA), (BA), and (PA) 21. Letters representing non-clear sounds in the (GA), (ZA), (DA), and (BA) columns are called "letters with dakuten," and they are denoted by adding a (") mark on the right shoulder of each letter that represents a clear sound in the (KA), (SA), (TA), and (HA) columns of FIG. 1, respectively. For example, the Japanese letter representing the GA sound in (GA) column (A) row 22 in FIG. 2 is written as (KA) [12 in FIG. 1] plus (") mark on the right shoulder of (KA) and written as (KA)". The far right column in FIG. 2 is the (PA) column 23, in which letters representing rupture sounds that correspond to P are shown. The letters in this column are denoted by adding an (°) on the right shoulder of the letters representing the sounds corresponding to H. For example, the Japanese letter representing the PA sound is written as (HA) [19 in FIG. 1] plus (°) on the right shoulder of the letter representing (HA) and written as (HA)°24.

In general, each column represents the consonant of the corresponding letter in the English alphabet, but with some exceptions. For example, the (ZA) column represents the Z sound, and the (DA) column represents the D sound; but the letters in the (ZA) column (I) row 25, and (DA) column (I) row 26, are both pronounced JI, and the letters in the (ZA) column (U) row 27 and (DA) column (U) row 28 are both pronounced ZU. This can be confusing because, even though these letters have the same pronunciation, they are written differently.

Figure 3:
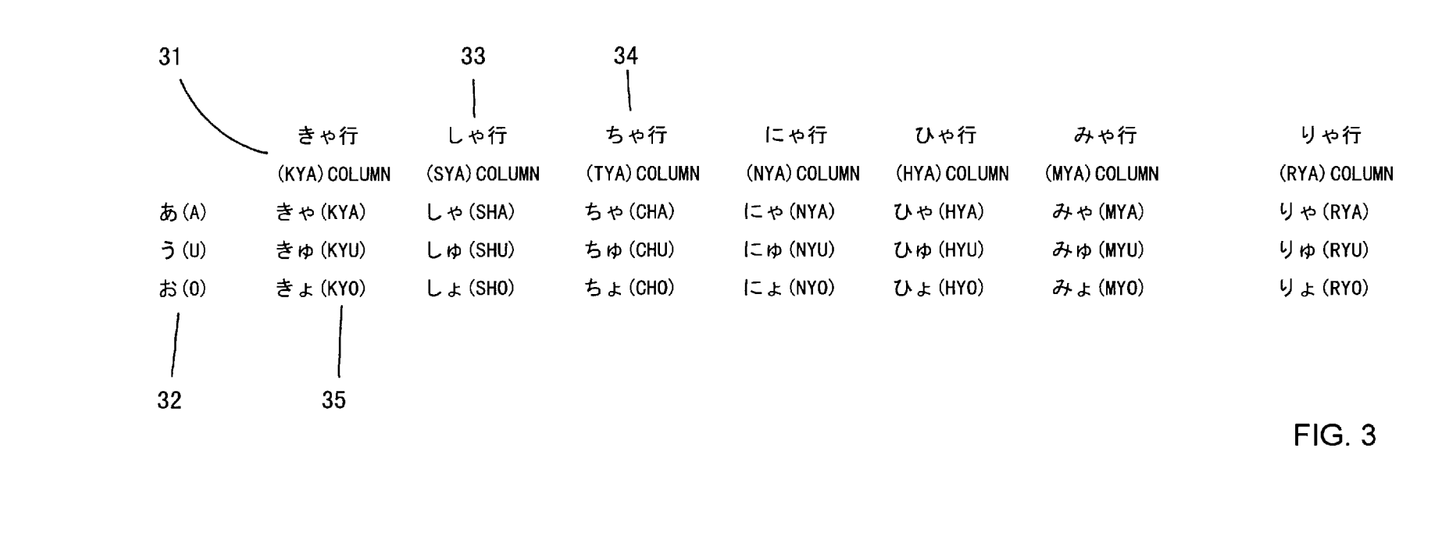
FIG. 3 shows the extended gojyuon table, which contains basic kana letters with the Y sound.

FIG. 3 is an extended gojyuon table showing letters that contain the Y sound between a clear-sounding consonant and a vowel, as in KYO (these letters are called yo-on in Japanese). The columns of the table are from left to right (KYA), (SYA), (TYA), (NYA), (HYA), (MYA), and (RYA) 30. There are only three rows, (A), (U), and (O) 31. Note that the (SYA) 33 and (TYA) 34 columns may be written as the (SHA) and (CHA) columns because they sound more like (SHA) and (CHA) than (SYA) and (TYA), respectively. Each cell in the table contains a combination of a normal-sized letter and a small letter. For example, the letter for the syllable KYO in (KYA) column (O) row is written as (KI)$_{(YO)}$ 35 in Japanese, a normal sized letter (KI) followed by a small letter (YO).

Figure 4:
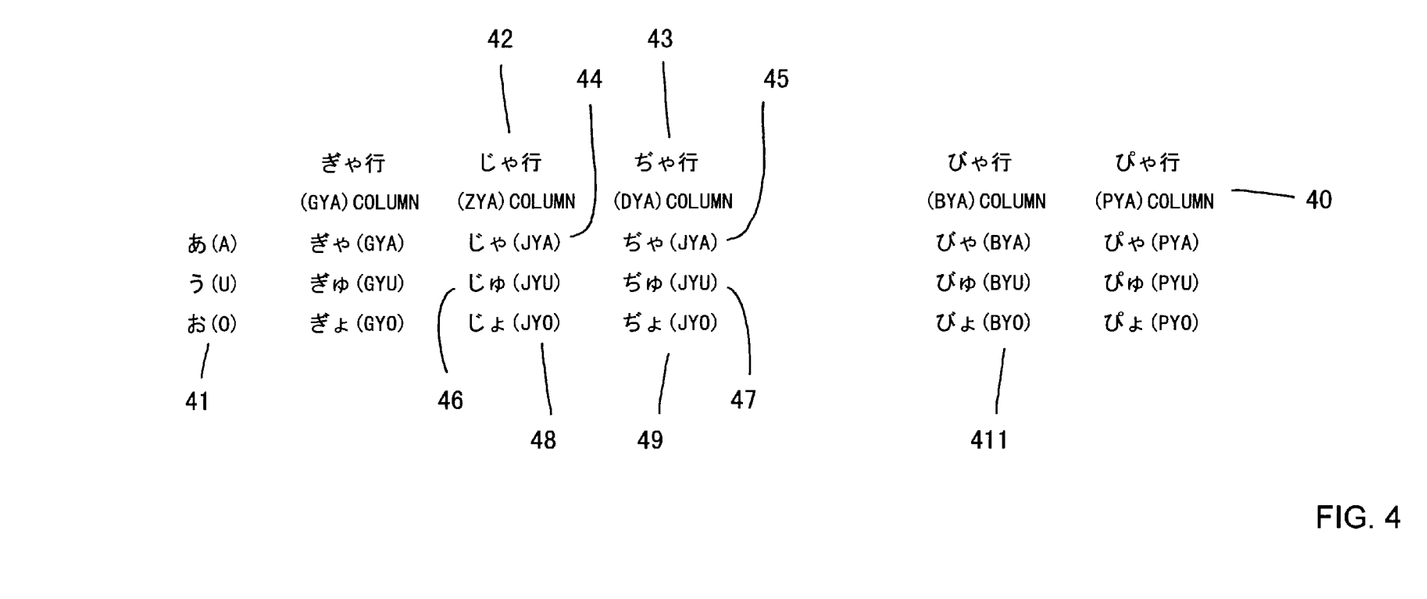
FIG. 4 shows the extended gojyuon table, which contains kana letters with "dakuten," and "maru," and the Y sound.

FIG. 4 is an extended gojyuon table showing letters that contain the Y sound between a non-clear-sounding consonant and a vowel (these letters are also called yo-on in Japanese). The columns of the table are (GYA), (ZYA), (DYA), (BYA), and (PYA) 40. The rows of the table are (A), (U), and (O) 41. Note that both the (ZYA) 42 and (DYA) 43 columns may be written as (JYA) columns because the letters in both these columns sound like (JYA), (JYU), and (JYO); but these notations have been selected because the letters all involve the Y sound and if we were to call both columns (JA) we could not distinguish between them. Note that the letters in (ZYA) column (A) row 44 and in (DYA) column (A) row 45 both sound as JA, the letters in (ZYA) column (U) row 46 and (DYA) column (U) row 47 both sound as JU, and the letters in (ZYA) column (O) row 48 and (DYA) column (O) row 49 both sound as JO, but they are written differently. Each cell in the table contains a combination of a normal-sized letter and a small letter. For example, the letter for the syllable BYO in (BYA) column (O) row is written as (BI)$_{(YO)}$ 411 in Japanese, a normal-sized letter (BI) followed by a small letter (YO). Or we could say that it is written as (HI)"$_{(YO)}$ because letter (BI) is written as (HI)" in Japanese.

Figure 5:
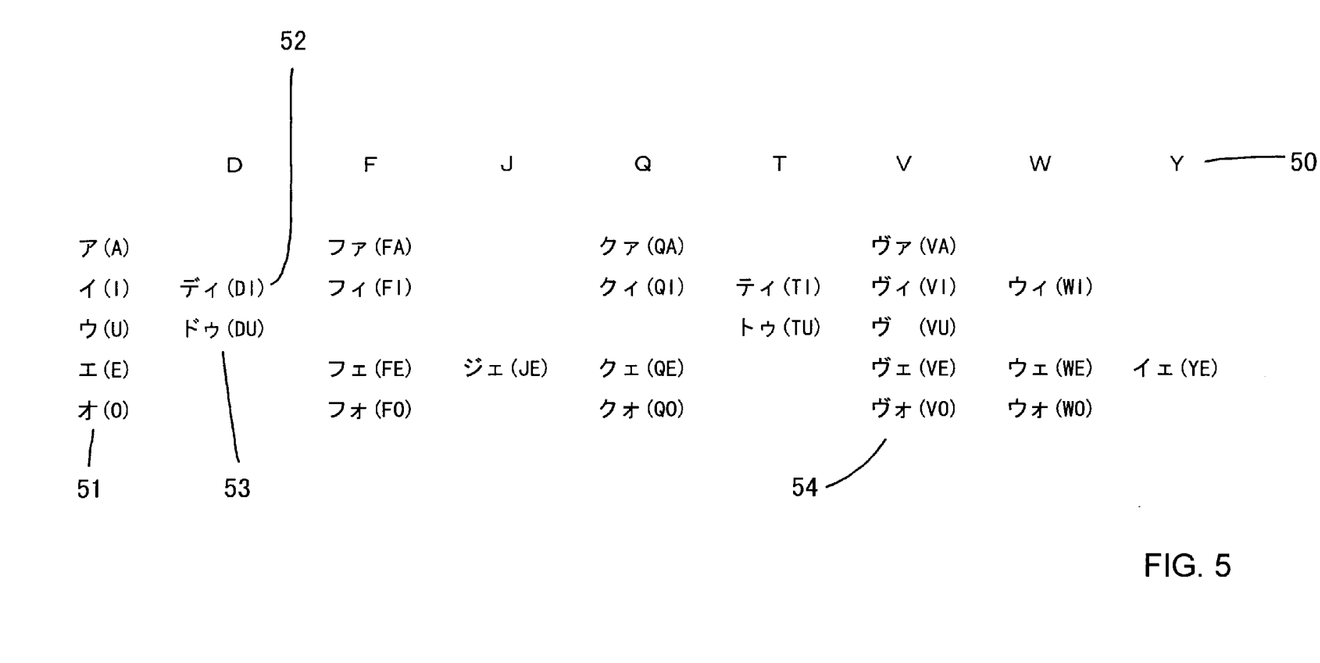
FIG. 5 shows kata kana letters for foreign-origin words, wherein each set of letters is created by inputting a consonant and a vowel from the English alphabet.
Figure 6:
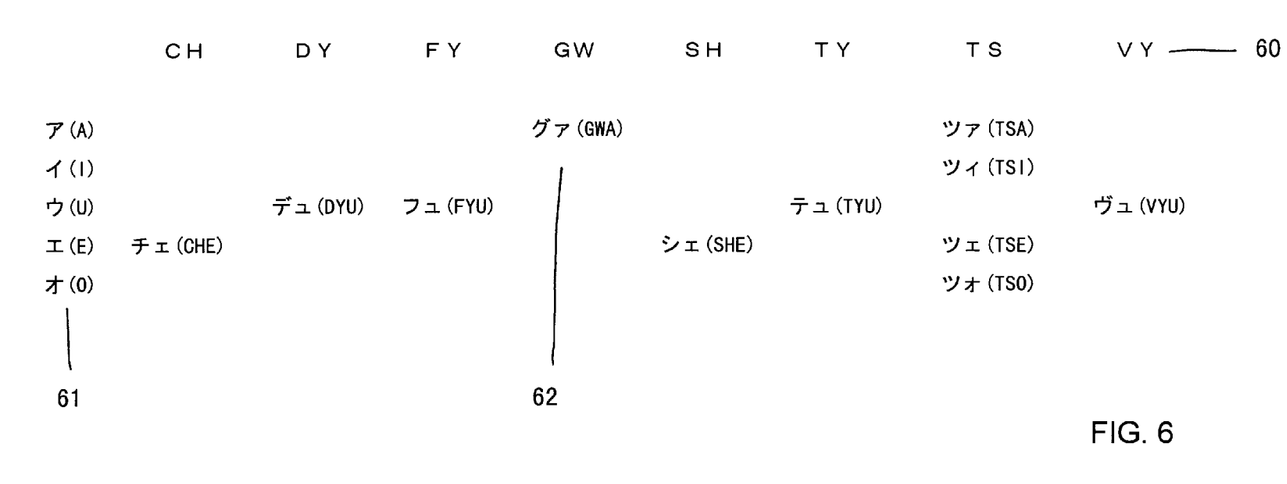
FIG. 6 shows kata kana letters for foreign-origin words, wherein each set of letters is created by inputting two consonants and a vowel from the English alphabet.

The letters shown in FIGS. 1 through 4 are hira kana letters. Foreign-origin words are written using kata kana letters; a kata kana version of FIGS. 1 through 4 exists but not shown in this document. FIGS. 5 and 6 show gojyuonlike tables for combinations (or spellings) of letters used to write foreign-origin expressions not found in ordinary Japanese words. Each of these special letters is created by combining a consonant and a vowel or two consonants and a vowel. FIG. 5 shows the letters used for foreign-origin expressions by combining the consonants D, F, J, Q, T, V, W, and Y 50, and the five vowels, A, I, U, E, and O 51. FIG. 6 shows the letters used for foreign-origin expressions by combining the consonants CH, DY, FY, GW, SH, TY, TS, and VY 60 and the vowels A, I, U, E, and O 61. The letters created are combinations of a normal-sized letter and a small letter. For example, a combination of letters D and I creates a combination of letters (DE)$_{(I)}$ [52 in FIG. 5] that sounds DI. Note that the kana letter created by the gojyuon column that corresponds to the letter D and the gojyuon row that corresponds to the letter I is (JI) that sounds as JI [see (DA) column (I) row 26 in FIG. 2]. In another example, D and U create a combination (DO)$_{(U)}$ [53 in FIG. 5] that sounds DU, while the kana letter created by gojyuon column D and row U is (ZU) that sounds ZU [see (DA) column (U) row 28 in FIG. 2].

The novel keyboard of this invention utilizes the characteristics of the gojyuon table. Each key shows either a column or a row of the gojyuon table. For inputting Japanese, the column (or consonant) and the row (or vowel) of the gojyuon table are input in sequence. Letters of the English alphabet could be placed on the keys independently of the keys that indicate column and row of gojyuon, but it would be advantageous to place a letter of the English alphabet on the key with a gojyuon row or column of a similar sound because this would help users remember the locations of the English alphabet keys.

As shown in the gojyuon table in FIGS. 1 and 2, the Japanese kana letter system can be expressed by five vowels, nine consonants, and the (") and (°) symbols. This means that if a key is assigned to each row and column of gojyuon and to each of the two symbols, a total of 16 keys (5 for rows, 9 for columns, and 2 for the symbols) would be sufficient for inputting all Japanese kana letters. But, because it is cumbersome to use the (") or (°) mark, we could use the (GA), (ZA), (DA), (BA), and (PA) columns as independent entities from the (KA), (SA), (TA), and (HA) columns and equip the keyboard with 5 row keys and 14 column keys. Then the total number of keys needed to input the Japanese kana letter system would be 19, still much less than the 26 of the English alphabet. But, in reality, these 19 letters are not enough for today's Japanese because of the growing number of foreign-origin words, and the need for the English alphabet to input them. Thus, the letters of the English alphabet should be arranged together with these 19 Japanese gojyuon column and row keys in a manner that will make sense to gojyuon input method users. The keys indicating columns (or consonants) may be placed on the right half of the keyboard, and the keys indicating rows (or vowels) may be placed on the left half of the home row. By doing so, in inputting Japanese, the right hand will input the column and left hand will input the row of the gojyuon table.

The keyboard-base input system of this invention will have three input modes; the gojyuon input mode for inputting Japanese, the expanded Hebon-shiki Roma-ji input mode for foreign-origin Japanese expressions, and the English input mode for inputting English. Of these three modes, the gojyuon input mode should be able to produce letters in both hira kana and kata kana. Foreign-origin expressions produced in the expanded Hebon Roma-ji input mode will be expressed in kata kana letters as shown in FIGS. 5 and 6. We call the method of spelling foreign-origin expressions using the English alphabet "the expanded Hebon-shiki Roma-ji" to distinguish it from Nihon-shiki Roma-ji and Hebon-shiki Roma-ji, both of which were designed to express Japanese original expressions using the English alphabet. We must do this because neither Nihon-shiki nor Hebon-shiki Roma-ji systems include consonants not found in Japanese. Hebon-shiki Roma-ji may be considered a subset of the expanded Hebon-shiki Roma-ji.

If the same key is assigned to a column or row of gojyuon and to a letter of the English alphabet of the same or similar sound, the surface of the key will show a letter that indicates a specific row or a column of the gojyuon table and a corresponding English letter. Because there are 26 English letters and 19 Japanese keys representing rows or columns of the gojyuon table, 7 English letters (C, F, J, L, Q, V, X) do not have corresponding Japanese keys, so each is assigned a separate key. A software or hardware switch will have to be implemented to switch between the gojyuon input mode and the expanded Hebon-shiki Roma-ji input mode so the same key may be used in two different ways.

Figure 7:
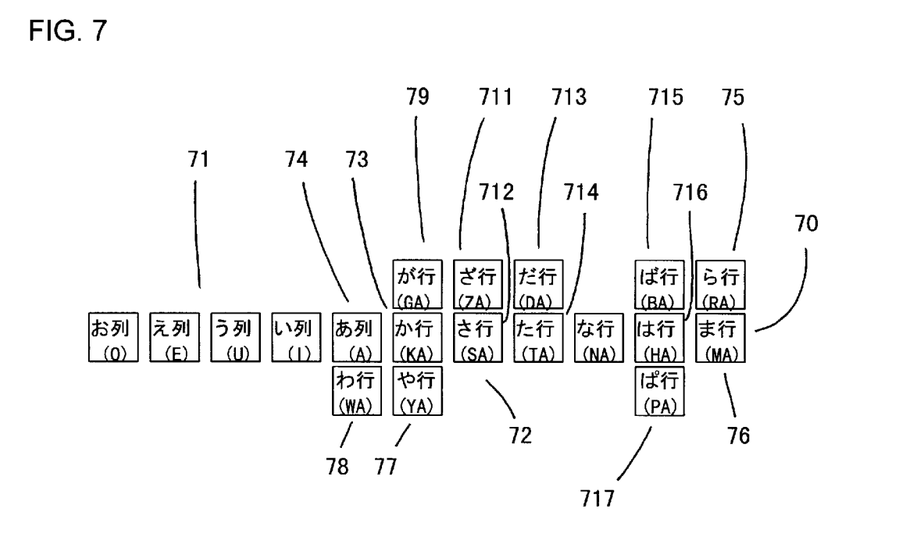
FIG. 7 shows an example of a gojyuon key arrangement.

FIG. 7 shows one possible arrangement of the row and column keys of the gojyuon input method; we call this Plan 1. Note that the Roma-ji notation with parentheses is for illustration only and will not appear on the Japanese keyboard. The key group consists of three rows of keys: the middle row is the home row 70 of the keyboard. The keys that represent gojyuon rows are placed in the left half of the home row of the keyboard, reading from right to left (A), (I), (U), (E), and (O) 71 so that the key that represents (O) row will be placed at the farthest left. The keys that represent gojyuon columns are placed in the right half of the keyboard. The keys representing columns (KA), (SA), (TA), (NA), (HA), and (MA) 72 are placed in the home row from left to right, in that order with the (KA) column key 73 placed immediately next to the key that represents (A) row 74. The key that represents the (RA) column 75 is placed in the top row above the key that represents the (MA) column 76. The keys that represent the (YA) 77 and (WA) columns 78 are placed in the bottom row of the keyboard; the key that represents the (YA) column 77 is below the key that represents the (KA) column 73, and the key that represents the (WA) column is below the key that represents the (A) row. The key that represents the (GA) column 79 is in the top row above the key representing the (KA) column 73. The key that represents the (ZA) column 711 is in the top row above the key representing the (SA) column 712. The key that represents the (DA) column 713 is in the top row above the key representing the (TA) column 714. The key that represents the (BA) column 715 is in the top row above the key representing the (HA) column 716, and the key that represents the (PA) column 717 is below the key representing the (HA) column 716.

Figure 8:
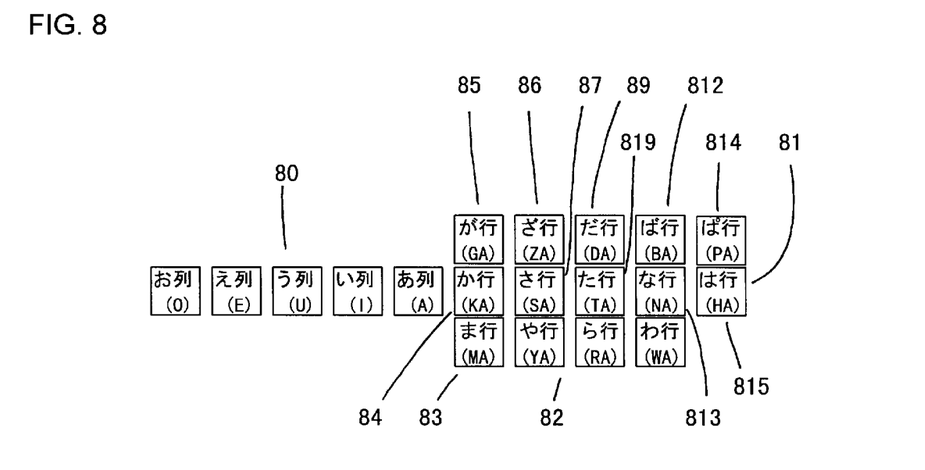
FIG. 8 shows an alternative gojyuon key arrangement.

FIG. 8 shows another possible key arrangement for the gojyuon input method; we call this Plan 2. In this case also, the Roma-ji notation with parentheses is for illustration only and will not appear on the Japanese keyboard. The keys that represent columns of gojyuon are placed in the right half of the keyboard, and the keys that represent rows of gojyuon are placed in the left half of the keyboard. The arrangement of keys that represent rows of gojyuon 80 is identical to that in Plan 1 (FIG. 7). The keys that represent the (KA) through (HA) columns are in the home row from left to right in the order (KA), (SA), (TA), (NA), and (HA) 81. The keys that represent the (MA) through (WA) columns are in the bottom row in the order (MA), (YA), (RA), and (WA) 82, with the key that represents the (MA) column 83 immediately below the key that represents the (KA) column 84. The key that represents the (GA) column 85 is in the top row above the key that represents the (KA) column 84; the key that represents the (ZA) column 86 is in the top row above the key that represents (SA) 87; the key that represents (DA) column 89 is in the top row above the key that represents the (TA) column 811; the key that represents the (BA) column 812 is in the top row above the key that represents the (NA) column 813; and the key that represents the (PA) column 814 is in the top row above the key that represents the (HA) column 815.

In both Plan 1 and Plan 2, the user's right hand will input the gojyuon column and the left hand will input the gojyuon row, in sequence. Of course, to input a letter that represents a vowel no column keys need to be pressed, and to input (N) no row keys need to be pressed. To input letters that include a Y sound between a consonant and a vowel, the user will press an appropriate column key followed by the (YA) column key and an appropriate row key. For example, to input the letters that represent the sound (KYO) [35 in FIG. 3], press the (KA) column key, the (YA) column key, and the (O) row key. To input the letters that represent the sound (JYO) [48, and 49 in FIG. 4], press the (ZA) column key, the (YA) column key, and the (O) row key, if the letters that represent the sound (JYO) 48 in the (ZYA) column of FIG. 4 is desired, and press the (DA) column key, the (YA) column key, and the (O) row key, if the letters that represent the sound (JYO) 49 in the (DYA) column of FIG. 4 is desired. To input letters that represent shortened sounds (soku-on) such as found in the word KITTO, one would press twice the key that represents the consonant (T in this example) of the following syllable (TO in this example). In this example, the Japanese letters that sound like KITTO are input by pressing the (KA) column key, (I) row key, (TA) column key twice, and (O) row key. To input letters that represent long sounds such as found in the word TO-RI, one would press the (-) mark (cho-on mark in Japanese or a hyphen in English) between two letters.

Figure 9:
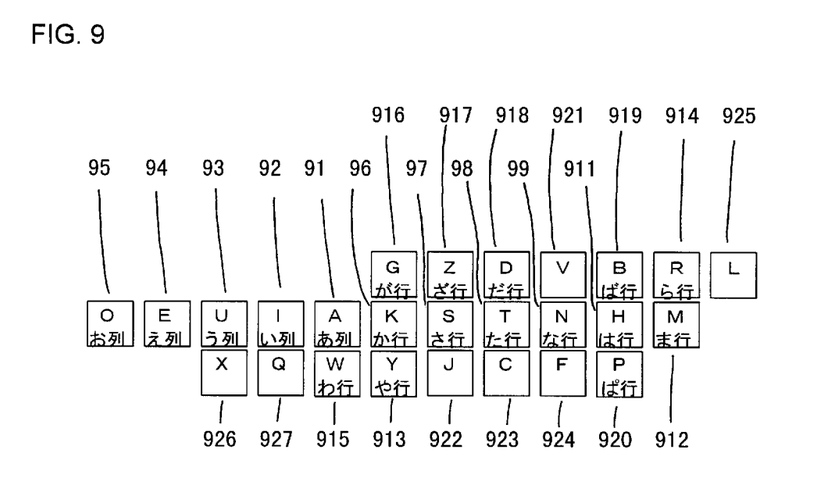
FIG. 9 shows the gojyuon key arrangement in FIG. 7 with an overlay of the corresponding English alphabet arrangement.

FIG. 9 shows how the English alphabet is overlaid on the Plan 1 gojyuon key arrangement shown in FIG. 7. A letter of the English alphabet is placed on the key that represents a row or column of the same or a similar sound. Letter A is placed on the key that represents (A) row 91; letter I is placed on the key that represents (I) row 92; letter U is placed on the key that represents (U) row 93; letter E is placed on the key that represents (E) row 94; letter O is placed on the key that represents (O) row 95; letter K is placed on the key that represents (KA) column 96; letter S is placed on the key that represents (SA) column 97; letter T is placed on the key that represents (TA) column 98; letter N is placed on the key that represents (NA) column 99; letter H is placed on the letter that represents (HA) column 911; letter M is placed on the key that represents (MA) column 912; letter Y is placed on the key that represents (YA) column 913; letter R is placed on the key that represents (RA) column 914; letter W is placed on the key that represents (WA) column 915; letter G is placed on the key that represents (GA) column 916; letter (Z) is placed on the key that represents (ZA) column 917; letter D is placed on the key that represents (DA) column 918; letter B is placed on the key that represents (BA) column 919; and letter P is placed on the key that represents (PA) column 920. Letter V 921 is placed on the top row between the D and B keys near the key that represents HA column because the V sound is close to the H sound in Japanese. Letter J 922 is placed in the bottom row below letter S because the J sound is close to the non-clear S sound in Japanese. Letter C 923 is placed in the bottom row next to J below letter T because the Ch sound is close to the T sound in Japanese. Letter F 924 is placed in the bottom row close to H between C and P because the F sound is close to the H sound in Japanese. Letter L 925 is placed on the top row next to R because the L sound in Japanese is close to the R sound. Letters X 926 and Q 927 are placed in the bottom row below U and I, respectively. In this way, the English letters are placed on the same keys or in close proximity to the gojyuon column or row keys of similar sounds. The V and F keys may be labeled as (VA) and (FA) columns in kata kana also. Both V and F sounds are used in spelling foreign words in Japanese. We call this arrangement of the English alphabet keys the gojyuon English alphabet arrangement.

For inputting foreign-origin words in Japanese, the consonant (or consonants) and the vowel of the spelling tables for foreign-origin words (FIGS. 5 and 6) are input in sequence using the English alphabet keys and the expanded Hebon-shiki Roma-ji input mode. For example, to input the letters that represents the sound (VO) [54 in FIG. 5], press the (V) key, and the (O) key. To input the letters that represents the sound (GWA) [62 in FIG. 6], press the (G) key, the (W) key, and the (A) key.

The locations of miscellaneous keys such as Enter and Tab are not described here, but they will be placed for easy use. To assist in touch-typing, a small raised dot may be added to the (SA) column key 97 and the (I) row key 92 on which the pointer fingers of the right and left hands are positioned, respectively, when they are in the resting position.

With regard to the arrangement of gojyuon row and column keys, the keys in the top row (GA) 916 through (BA) 919 and the keys in the bottom row (YA) 913 through (PA) 920 are interchangeable. The gojyuon row keys may be arranged from left to right, instead of right to left as shown in the figures and described earlier; and the column keys may be arranged from right to left, instead of left to right as shown in the figures and described earlier. The locations of the (YA) 913 and (WA) 915 column keys are also interchangeable, and the English Q 927, L 925, and X 926 keys may be placed in places other than specified in FIG. 9 and described above. Any changes in gojyuon key locations will result in changes in locations of the corresponding English letter keys.

A possible modification in the key arrangement will be to add keys that represent small letters $(YA), (I), (YU), (E),$ and $(YO)$ for inputting letters that include the Y sound such as KYO. If additional keys to represent these letters are added, the (WA) 915 and (YA) 913 column keys in Plan 1 must be moved to the right by one key to make space for them.

In FIGS. 7, 8, and 9, the keys are shown both laterally and longitudinally in straight lines. But the keys may not necessarily be so arranged. For example, the (GA) column key [79, 85, and 916, respectively in FIGS. 7, 8, and 9] may be placed slightly to the left of its location in FIGS. 7, 8, and 9, and the (Y) column key [77, and 913, respectively in FIGS. 7 and 9] may be placed slightly to the right of its location in FIGS. 7 and 9.

Figure 10:
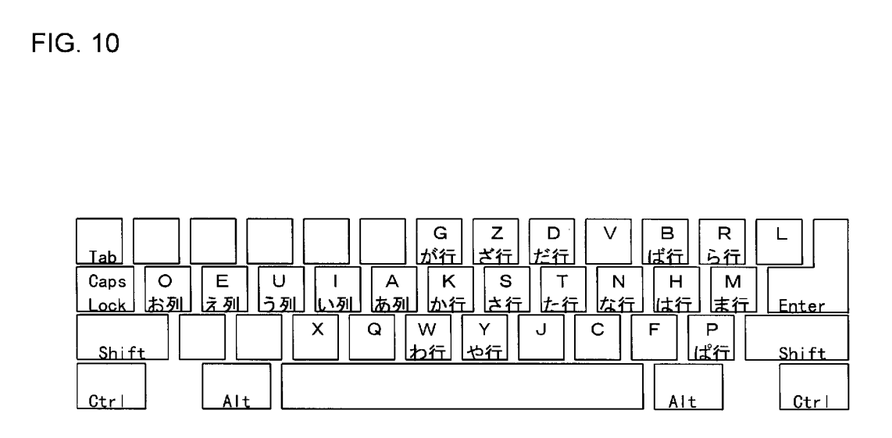
FIG. 10 shows the keyboard with the gojyuon key arrangement in FIG. 7 with an overlay of the corresponding English alphabet arrangement.

FIG. 10 shows the Plan 1 key arrangement of gojyuon row and column keys with the corresponding arrangement of the English alphabet keys on the conventional keyboard. Miscellaneous keys, such as the colon and period are kept blank in the illustration. The arrangement of letter keys in FIG. 10 is substantially the same as that in FIG. 9. The English alphabet keys are used to input English and foreign-origin Japanese in the extended Hebon-shiki Roma-ji input mode, and the gojyuon row and column keys are used to input Japanese. Switching between the gojyuon input mode and the English (or Roma-ji) input mode may be achieved by a software or hardware switch. Even though it is not shown in FIG. 10, a key for switching between the gojyuon mode and the English alphabet mode may be added to the keyboard.

Figure 11:
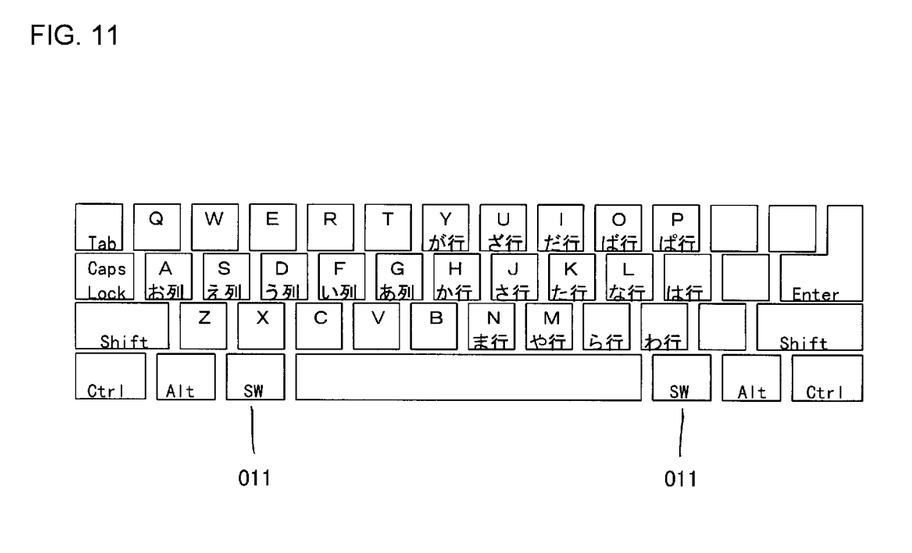
FIG. 11 shows the keyboard with the gojyuon key arrangement in FIG. 8 with an overlay of the QWERTY arrangement.

FIG. 11 shows the Plan 2 key arrangement of gojyuon row and column keys with the QWERTY arrangement of the English alphabet keys on the conventional keyboard. The arrangement of the gojyuon row and column keys are substantially the same as the arrangement found in FIG. 8. In this example also, miscellaneous keys, such as colon, period and the like, are not shown. In the keyboard, English alphabet keys are used to input English and foreign-origin Japanese in the extended Hebon-shiki Roma-ji input mode, and gojyuon row and column keys are used to input Japanese. The key shown as 'SW' 011 is used to switch the input mode between the gojyuon and the English alphabet input modes.

Figure 12:
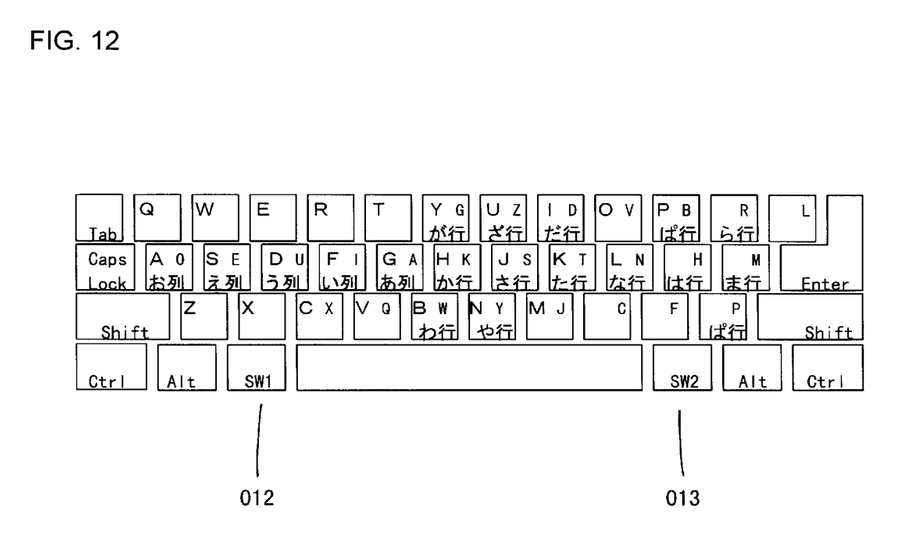
FIG. 12 shows the keyboard with the gojyuon key arrangement in FIG. 7 with an overlay of the corresponding English alphabet arrangement, and the QWERTY key arrangement.

FIG. 12 shows the Plan 1 key arrangement, the gojyuon arrangement of the English alphabet, and the QWERTY key arrangement. The large English letters on the keys show the QWERTY key arrangement, and the small English letters show the gojyuon key arrangement. Again, miscellaneous keys are not shown. The key shown as 'SW1' 012 switches between the QWERTY and gojyuon arrangements, and the key shown as 'SW2' 013 switches between the gojyuon Japanese and the gojyuon English input methods. The key labels of the QWERTY arrangement may have to be placed on the front, not the top surface to avoid confusion. Note that it is possible to use the gojyuon English alphabet arrangement for the Roma-ji input method to input English.

The key arrangement for the currently used iroha input method could also be combined with that for the gojyuon input method. In this case, various combinations of the four key arrangement methods (gojyuon Japanese, iroha Japanese, gojyuon English, and QWERTY) could be implemented or all four methods together, with necessary switches. The key label of the third and fourth input methods may have to be added to the front surface of the keys or keycaps indicating any combination of these key identifiers may be used in conjunction with the switch when necessary.

Figure 13:
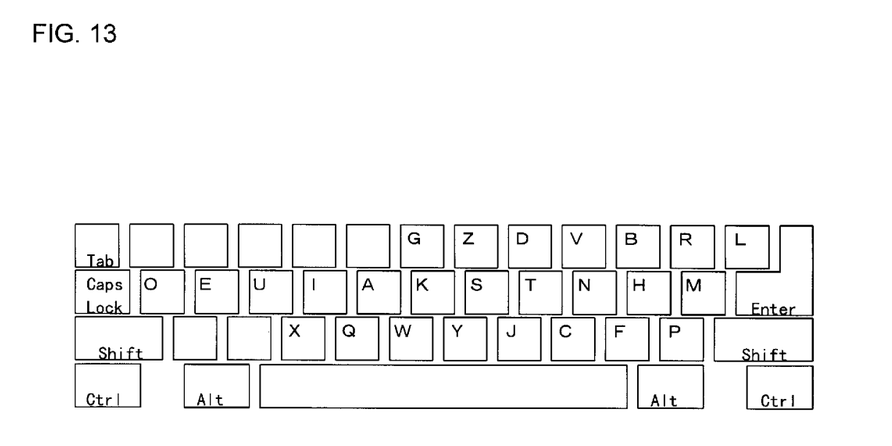
FIG. 13 shows the gojyuon English alphabet arrangement.
Figure 14:
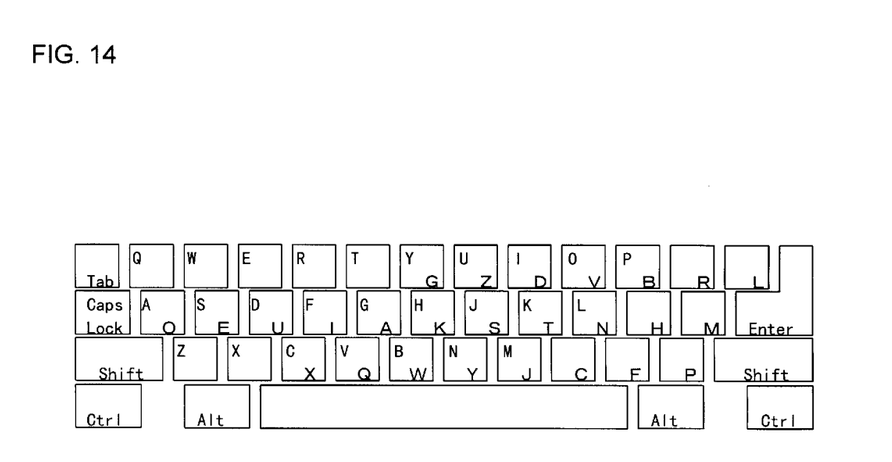
FIG. 14 shows the keyboard with two sets of English letters, one with the gojyuon arrangement, and the other with the QWERTY arrangement.

Placing the English alphabet keys alone without the gojyuon column and row keys is also possible. The English alphabet keys may be arranged on the keyboard in the manner that follows the gojyuon key arrangement specifications for the English alphabet keys (FIG. 13). The gojyuon English key arrangement and QWERTY key arrangement may be implemented on the same keyboard with a software or hardware switch (not shown in FIG. 14) without gojyuon column and row keys, as shown in FIG. 14.

The software used in conjunction with the keyboard enables the user to input the data through the keyboard to the computer, processes the input data, converts the input data into the form specified by the user, and displays the converted input data on the computer display. The software may be a part of the operating system of the computer, or a supplement to the operating system.

The input mode at the keyboard and the display mode on the computer monitor screen (or the input letter type displayed on the computer monitor screen) may be specified independently, or together (in the software currently available on the market, no distinction is made between the input mode and the display mode).

Three input modes are considered:
(1) the gojyuon
(2) the expanded Hebon-shiki
(3) the English alphabet.

Three display modes are considered:
(a) the hira kana (full size and half size characters)
(b) the kata kana (full size and half size characters)
(c) the English alphabet.

Specifying the input mode alone will assume a default display mode that matches the input mode, and specifying the display mode alone will assume a default input mode that matches the display mode. The relationship between the input mode, display mode and input data type actually going into the computer is shown in Table 1.

TABLE 1

Relationship between Input Mode, Display Mode, and Input Data When Default Settings are Used for either Input or Display Mode

| Input mode | Display mode | Input to the computer |
| --- | --- | --- |
| Gojyuon | — | Hira kana (gojyuon spelling) |
| Expanded Hebon | — | Kata kana (spelling for foreign-origin Japanese expressions) |
| English alphabet | — | English alphabet |
| — | Hira kana | hira kana (gojyuon spelling) |
| — | Kata kana | Kata kana (spelling for foreign-origin Japanese expressions) |
| — | English alphabet | English alphabet |

To specify the input mode alone, the user must press the key for the desired input mode (or click the mouse at the desired icon) twice in sequence—If the key for the desired input mode is pressed only once, the existing display mode will be selected. For example, if the user presses the key for the gojyuon input mode twice (or clicks the icon for the gojyuon input mode twice), the display mode will be automatically changed to its default setting of the hira kana mode.

Sometimes the user may want to write Japanese-origin words using kata kana, or foreign-origin words in hira kana. Sometimes the user may want to spell foreign-origin words in special way not found in FIGS. 5 and 6. It is obvious that input and display mode specification needs more flexibility than is available with the default settings.

The gojyuon input method must be able to incorporate both hira kana and kata kana display modes, and the expanded Hebon-shiki Roma-ji input mode must be able to incorporate hira kana and kata kana display modes. Then, for example, if the user types in a combination of 'd' and 'i' in the gojyuon input mode, the character that is pronounced (ji), will appear on the monitor screen in either hira kana or kata kana display mode. If the user types in a combination of 'd' and 'i' in the Hebon-shiki Roma-ji input method, the combination of characters that is pronounced (di) will appear on the monitor screen in either hira kana or kata kana display mode.

Ideally the software used in conjunction with the keyboard will be able to translate between Japanese-origin words and English words, and between foreign-origin Japanese words and English words. Then, for example, if input mode is gojyuon and the display mode is English, the translation software will automatically translate the Japanese word into English and the English word will be input to the computer and also displayed on the computer monitor screen. If the software finds more than one corresponding English word for the typed-in Japanese word, or the other way around, the user should be able to select the word to be input to the computer.

The outcome of selecting whole combinations of input modes and display modes is listed Table 2.

The input method described here should also work with a keyboard that has no gojyuon notation and has only the English alphabet on the surface of each key as long as the user remembers that K, S, T, N, H, M, Y, R, W, G, Z, D, B, and P in the English alphabet represent gojyuon columns under the gojyuon input mode, and that under the expanded Hebon-shiki Roma-ji mode, each English letter represents a sound (not a

TABLE 2

Relationship between Input Mode Display Mode and Input Data When Both Input and Display Modes are Specified

| Input mode | Display mode | Input to the computer |
| --- | --- | --- |
| Gojyuon | Hira kana | Hira kana (gojyuon spelling) |
|  | Kata kana | Kata kana (gojyuon spelling) |
|  | English alphabet | Appropriate English words are selected by software |
| Expanded Hebon | Hira kana | Hira kana (spelling for foreign-origin Japanese expressions) |
|  | Kata kana | Kata kana (spelling for foreign-origin Japanese expressions) |
|  | English alphabet | Appropriate foreign words are selected by software and spelled in English alphabet |
| English alphabet | Hira kana | Appropriate Japanese words are selected by software and spelled in hira kana (gojyuon spelling) |
|  | Kata kana | Appropriate foreign-origin Japanese words are selected by software and spelled in kata kana (spelling for foreign-origin Japanese expressions) |
|  | English alphabet | English alphabet as input on the keyboard | column of the gojyuon table), and that inputting the same combination of letters in gojyuon mode and expanded Hebon-shiki mode results in different Japanese letters for some combinations of letters (for example, those involving the letters D and T). Under the English alphabet mode, each letter represents itself.

This invention having been described in detail in accordance with the requirements of the patent statutes, various other changes and modifications will suggest themselves to those skilled in this art. For example, it will be apparent that the locations of the keys might be slightly changed, the rows of keys changed, or extra keys not described here added to the keyboard. It will also be apparent that the keys need not be arranged in a straight line. The keyboard may be split into two halves, one for the right hand and the other for the left hand. The surface of the keyboard may be made non-flat. It is intended that these and other such changes and modifications shall fall within the scope of the invention defined in the appended claims. The details of the keyboard hardware and possible software are not described here. It is understood that for those skilled in this art detailed description of the design of the required hardware and software for this keyboard is not necessary.

I claim:

1. A keyboard comprising a plurality of keys for operation by an operator for use with a first, gojyuon, table of Japanese letters for inputting original Japanese words to computer means in a first mode of operation, said keyboard including a home row of keys, a bottom row of keys closer to the operator than said home row of keys, and a top row of keys further from the operator than said home row of keys, some of said keys comprising gojyuon row keys for use in specifying a row in said first table and others of said keys comprising gojyuon column keys for use in specifying a column in said first table, said gojyuon column keys being located substantially at one of the right half and left half of said keyboard and said gojyuon row keys being located substantially at the other of said right half and left half of said keyboard, said gojyuon row keys being located in said home row of keys and having Japanese gojyuon row notations O, E, U, I and A thereon, and said gojyuon column keys being located in said home, bottom and top rows of keys and having Japanese gojyuon column notations KA, SA, TA, NA, HA, MA, GA, ZA, DA, BA, RA, WA, YA and PA thereon.

2. A keyboard as defined in claim 1 wherein said keys having said Japanese gojyuon row notations are in sequence O,E,U,I and A from left to right in said home row of keys.

3. A keyboard as defined in claim 1 wherein said keys having said Japanese gojyuon column notations KA, SA, TA, NA and HA are included in said home row of keys in sequence from left to right.

4. A keyboard as defined in claim 3 wherein said keys having said Japanese gojyuon column notations GA, ZA and DA are included in said top row of keys substantially directly above said keys having said Japanese gojyuon column notations KA, SA and TA, respectively.

5. A keyboard as defined in claim 1 wherein said keys having said Japanese gojyuon column and row notations GA, ZA, DA, BA, RA, KA, SA, TA, NA, HA, MA, WA, YA, PA, O, E, U, I and A include thereon English alphabet letters G, Z, D, B, R, K, S, T, N, H, M, W, Y, P, O, E, U, I and A, respectively, for use with a second table of Japanese letters for inputting foreign-origin Japanese words to said computer means in a second mode of operation, said some of said keys comprising row keys for use in specifying a row in said second table and said others of said keys comprising column keys for use in specifying a column in said second table in said second mode of operation, and means for use in switching between said first and second modes of operation.

6. A keyboard as defined in claim 5 wherein said means for use in switching between said first and second modes of operation includes key means on said keyboard.

7. A keyboard as defined in claim 6 including keys having English alphabet letters V, L, X, Q, J, C and F thereon adjacent keys having said Japanese gojyuon row and column notations thereon for use in said second mode of operation.

8. A keyboard as defined in claim 7 wherein said key having said English alphabet letter J thereon is located adjacent said key having said Japanese gojyuon column notation SA thereon, said key having said English alphabet letter C thereon is located adjacent said key having said Japanese gojyuon column notation TA thereon, and said key having said English alphabet letter L thereon is located adjacent said key having said Japanese gojyuon column notation RA thereon.

9. A keyboard as defined in claim 8 wherein said keys having said English alphabet letters V and L thereon are located in said top row of keys, and said keys having said English alphabet letters J, C and F thereon are located in said bottom row of keys.

10. A keyboard as defined in claim 9 wherein said key having said English alphabet letter L thereon is located in said top row of keys, and said key having said English alphabet letter X thereon is located in said bottom row of keys.

11. A keyboard comprising a plurality of keys for operation by an operator for use with a first, gojyuon, table of Japanese letters for inputting original Japanese words to computer means in a first mode of operation and for use with a second table of Japanese letters for inputting foreign-origin Japanese words to said computer means in a second mode of operation, said keyboard including a home row of keys, a bottom row of keys closer to the operator than said home row of keys, and a top row of keys further from the operator than said home row of keys, some of said keys comprising row keys for use in specifying a row in said first table in said first mode of operation and for use in specifying a row in said second table in said second mode of operation, others of said keys comprising column keys for use in specifying a column in said first table in said first mode of operation and for use in specifying a column in said second table in said second mode of operation, said row keys having English alphabet row notations O,E,U,I and A thereon and said column keys having English alphabet column notations G, Z, D, B, R, K, S, T, N, H, M, W, Y, and P thereon for use in identifying said rows and columns of both said first and second tables, and means for use in switching between said first and second modes of operation.

12. A keyboard as defined in claim 11 wherein said English alphabet column keys are located substantially at one of the right half and left half of said keyboard and said English alphabet row keys are located substantially at the other of said right half and left half of said keyboard.

13. A keyboard as defined in claim 12 said row keys having said English alphabet row notations are in sequence O,E,U,I and A from left to right in said home row of keys.

14. A keyboard as defined in claim 13 wherein said column keys having said English alphabet column notations K, S, T, N and H are included in said home row of keys in sequence from left to right.

15. A keyboard as defined in claim 14 wherein said column keys having said English alphabet column notations G, Z and D are included in said top row of keys substantially directly above said keys having said English alphabet column notations K, S and T, respectively.

16. A keyboard as defined in claim 11 wherein additional others of said keys have English alphabet notations C, F, J, L, Q, V and X thereon for use with means operable in an English language mode of operation for generating English letters together with said keys having English alphabet notations O,E,U,I,A,G,Z,D,B,R,K,S,T,N,H,M,W,Y, and P thereon, and means for use in switching between said English language mode of operation and said first and second modes of operation.

* * * * *